May 14, 1957  A. M. DE CARLO PIETROPINTO  2,791,960
DESIGN COOKIE MAKING APPLIANCE
Filed June 28, 1954  3 Sheets-Sheet 1
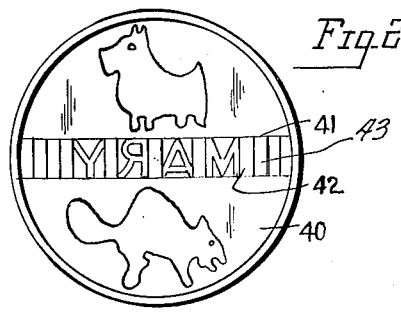
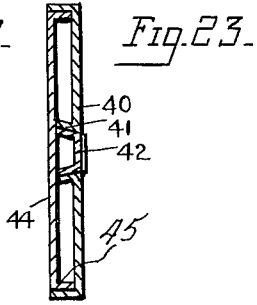
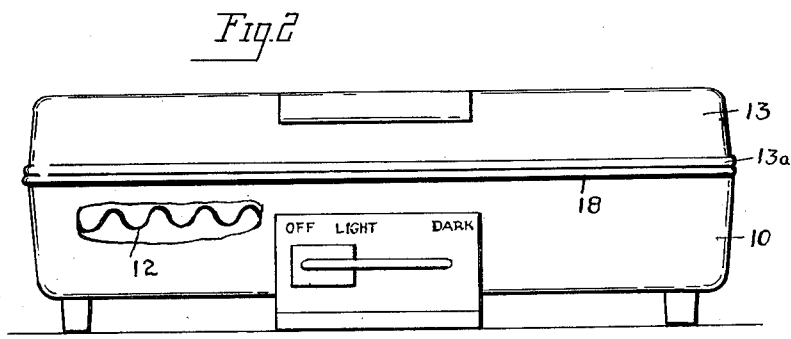
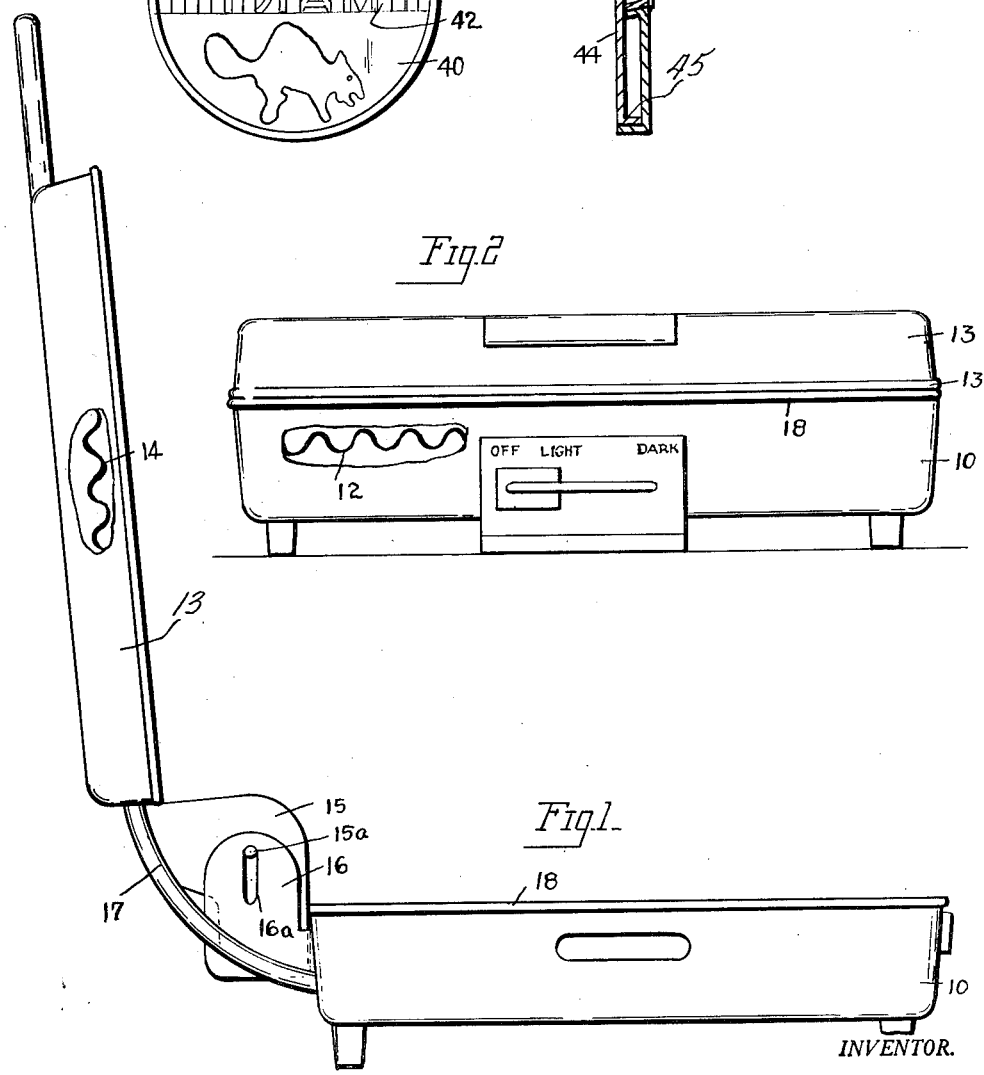
INVENTOR.
Anna M. De Carlo Pietropinto May 14, 1957    A. M. DE CARLO PIETROPINTO    2,791,960
DESIGN COOKIE MAKING APPLIANCE Filed June 28, 1954      3 Sheets-Sheet 2

INVENTOR.
Anna M. De Carlo Pietropinto

May 14, 1957  A. M. DE CARLO PIETROPINTO  2,791,960
DESIGN COOKIE MAKING APPLIANCE
Filed June 28, 1954  3 Sheets-Sheet 3
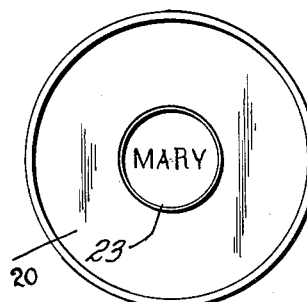
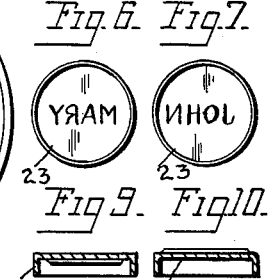
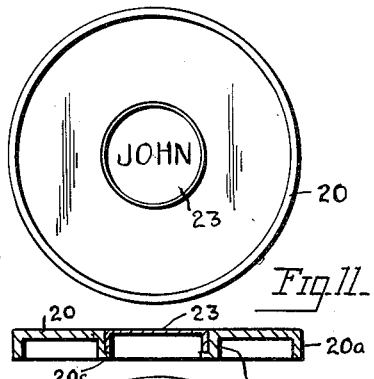
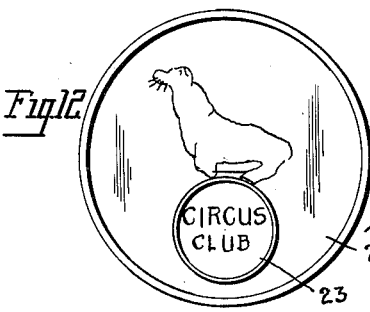
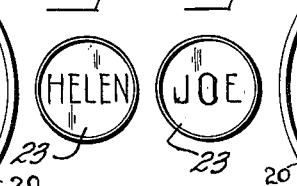
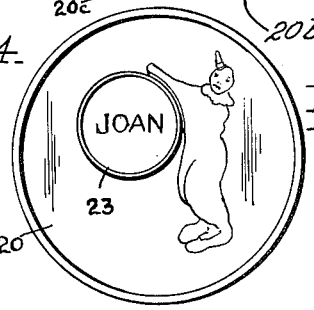
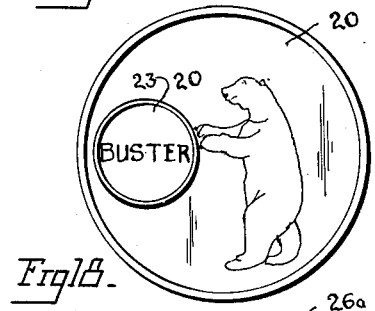
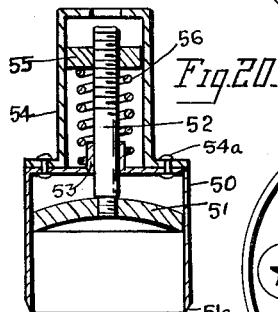
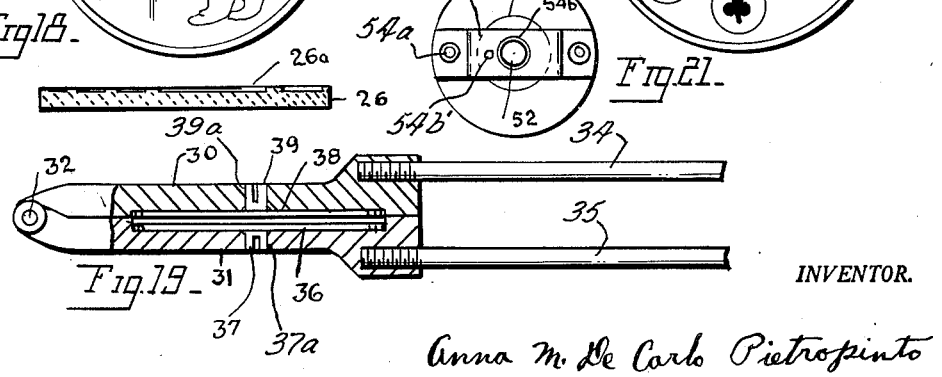
INVENTOR.
Anna M. De Carlo Pietropinto

United States Patent Office 2,791,960
Patented May 14, 1957

2,791,960
DESIGN COOKIE MAKING APPLIANCE
Anna M. De Carlo Pietropinto, New York, N. Y.
Application June 28, 1954, Serial No. 439,630
2 Claims. (Cl. 99—430)

This invention relates to an improved device for making cookies and edible articles made of enticing food combinations, and one of its objects is to provide an attachment which can be used on existing electrical or gas heated cooking appliances, for converting these appliances for cookie baking, which can be operated in homes or small stores or supply centers, to produce cookies of desirable thinness, and which can be provided with the names of children or social groups, or provided with any variety of designs selected from a general supply of prepared design or figure forms.

Another object of the invention is to provide a cooking appliance or attachment, with a series of circular or other openings, and an ornamented disc to fill each of these openings, which is cast, embossed or otherwise provided with one or more ornamental figures or designs, and a minor insert which may be provided with the name of child or social center, or any group, which may be a school or other assembly or organization.

A still further object of the invention is the provision of a cookie embossing or printing plate with one or more ornamental printing or embossing discs or inserts and means for adjusting these inserts or discs, so that cookies or food articles of varying thicknesses may be produced.

With the above and other objects in view the invention comprises certain new and useful constructions, combinations and arrangements of parts, clearly described in the following specification and fully illustrated in the accompanying drawings, in which:

Fig. 1 is an end elevation, showing a standard type of electrical cooking unit, particularly designed for applying electrically generated heat to both sides of a group of waffles or hot cakes, or similar food articles, showing the electrically heated cover in raised position.

Fig. 2 is a front elevation of the unit showing the cover closed.

Fig. 5 is a plan view of one of the embossing discs, showing the bottom face thereof.

Fig. 6 is a similar view of one of the minor discs, embossed to print a girl's name, as "Mary," showing the upper or printing or negative side thereof.

Fig. 7 is a similar view of another minor disc insert, showing the name of a boy, "John" in negative or printing face.

Fig. 8 is a bottom plan view of a large disc, showing it equipped with the disc shown in Fig. 7.

Fig. 9 is a detail cross sectional view of the small or minor disc shown in Figs. 5 and 6.

Fig. 10 is a similar view of the disc shown in Fig. 7.

Fig. 11 is a cross sectional view of the composite disc.

Fig. 12 is a bottom plan view of a composite disc showing a circus animal for printing or embossing.

Fig. 13 is a bottom plan view of another minor disc showing the name of a girl.

Fig. 14 is a bottom plan view of another minor disc showing the name of a boy.

Fig. 15 is a bottom plan view of another composite disc, showing a clown figure displayed and a minor disc having the name of a girl.

Fig. 16 is a bottom plan view of another composite disc, showing the figure of a bear and a minor disc having the name of a boy.

Fig. 17 is another bottom plan view of a composite disc, showing a minor disc with the name of a girl and a series of symbolic designs combined with a lunar display.

Fig. 18 is a cross sectional view of a printing or embossing disc constructed of molded or cast cement.

Fig. 19 shows a hand cooking unit for cooking cookies on a gas burner, or electrical hot plate, having a pair of cooking embossing discs detachably mounted therein, shown partly in elevation and mainly in section.

Fig. 20 is a detail sectional view of a batch measuring unit, for accurately measuring the cookie dough which is required for making cookies of any given thickness.

Fig. 21 is a top plan view of the Fig. 20 device.

Fig. 22 is a plan view of a modified cookie embossing disc showing the use of movable type.

Fig. 23 is a central sectional view thereof, taken at right angles to the row of movable type.

Figure 3:
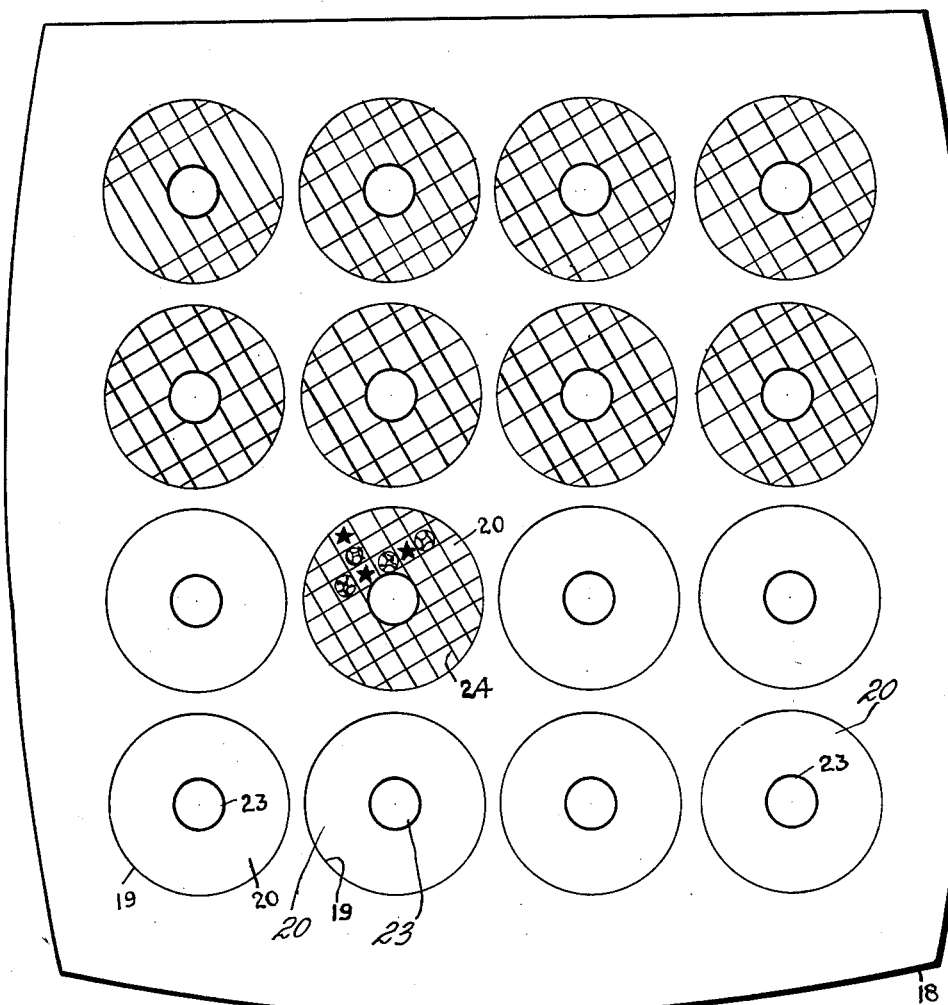
Fig. 3 is a top plan view of one of the detachable cookie embossing or printing plates, shown removed from the electrical appliance.

Referring to Figs. 1 to 4, inclusive, 10 designates a standard type of electrical cooking appliance, designed and widely used for making waffles and wheat or hot cakes, which includes a base section 11, having an electrical resistance unit 12 therein, and a cover or top section 13, having an electrical resistance unit 14 therein.

The top section is provided with hinge means 15, which engage mating hinge means 16 carried by the base section. The top or cover section hinge includes a pintle 15a which slidably engages the vertical slot 16a of the base hinge, so that the top or cover section can close in parallel relation to the base section with different thicknesses of dough between the two sections. A flexible electrical conduit 17 conducts electrical current from the base section to the top section. These features are old and well known.

The base section is equipped with a top plate 18, preferably of cast aluminum, or it may be stamped, which can be coupled to the base in any suitable manner. This top plate is constructed with a series of openings 19, which may be circular or any other suitable shape. As shown the openings are circular and are filled by means of the embossing or printing discs 20. By making the openings of a common size the discs may be inserted in any of these openings.

Each of the discs 20 is formed with an outer marginal edge flange 20a, and with a central or internal flange 20b, also shown to be circular and disposed in concentric relation to the outer flange 20a. The internal or central disc flange 20b is formed with a stop edge flange 20c.

The top or cooking plate 18 is formed with a circular or other shaped flange 19a, which bounds the opening 19, and a circular ring 21 is adjustable in this flange 19a. In the case, as shown, when the flange 19a is circular, the ring 21 has a screw threaded engagement therewith, and is provided with a cross bar 21a which serves as a handle for turning the screw sleeve or ring. This cross bar handle is formed with a central opening 21b, which is disposed directly under the stop flange 20c. The external flange 20a is engaged with the adjustable ring 21.

The disc 20 is shown to be disposed below the service side of the cooking plate 18, to provide a dough receiving pocket 22. By regulating the ring 21 the disc 20 may be raised so as to reduce the thickness of the cookie produced by the baking of the dough placed in the pocket 22, and by lowering the adjustable ring 21 the thickness of the cookie produced may be increased.

In the central or internal circular flange 20b a minor or smaller circular disc 23 is snugly inserted, so that it seats on the stop flange 20c, so that its own upper surface will be level with the upper surface of the main disc 20. The disc 20 is embossed or cast to provide a series of ornamental field designs or figures 24, which may consist of forms of small flowers and symbols, like stars and the like, arranged in parallel or scattered grouping.

Figure 4:
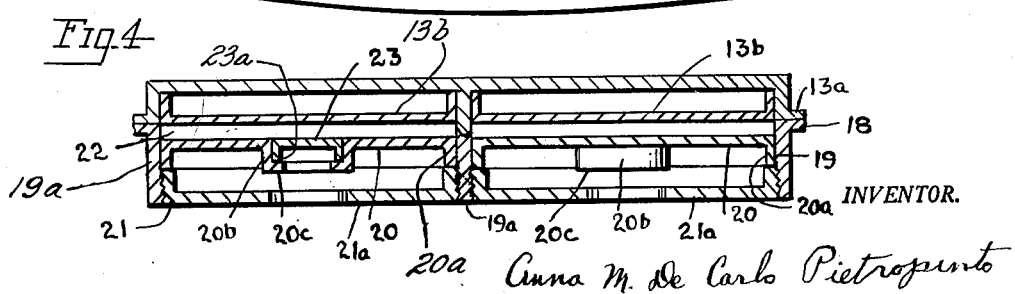
Fig. 4 is an enlarged sectional view taken across two adjoining embossing or printing discs set in a cooking plate, there being shown cooperating embossing discs set in an overlying cooking plate as well.

In Fig. 4 the top section or cover 13 is superimposed upon the top plate 18 of the base section. In 13 there is positioned a cooking plate 13a in which there is mounted a disc 13b corresponding to disc 20 mounted in cooking plate 18. It should be noted that by varying the position of circular ring 21 in height relative plate 18, cooking plates 22 may be varied in height and therefore the amount of dough placeable therebetween may be correspondingly varied. Discs 13b may be held within plate 13a either by frictional engagement or by conventional locking means not shown.

The small cupped disc 23 is formed with an external flange 23a, which provides a bearing for centering the disc 23 in the main disc 20. This minor disc may be made of drawn or stamped aluminum or metal, and its top wall may be embossed or otherwise molded or impressed to carry the name of a child or adult person, or of a social or business or labor or religious group. In Figs. 5 to 18, I show the use of the main disc to produce different field designs on the cookie disc or wafer, and the use of the minor disc to impress the names of boys or girls on the cookies made.

In Figs. 5 and 8 the minor disc 23 is shown to be disposed concentric to the main disc 20. In Fig. 12 the minor disc 23 is shown to be disposed eccentric to the main disc 20, in this case below the center of the main field design, shown to take the form of a seal figure. In Fig. 15 the minor disc 23 is shown to be disposed above the center of the field design, which includes the showing of a circus clown. In Fig. 16 I show a main disc having a design of a bear standing on his hind legs with his fore legs disposed against the edge of the minor disc 23, which is shown to be eccentric to the main disc. In Fig. 17 I show a field design which includes the symbols of playing cards and a star, with lunar crescent partly encircling the minor disc 23.

In Fig. 18 I show a main and printing disc 26 formed from cast or molded asbestos of other refractory cement or material, which can be done at home or in a small bakery with molding equipment designed for this service.

In Fig. 19 I show a view partly in section and partly in elevation of a hand device for baking premolded cookies upon a gas or electrical stove, or an oil burner stove. Two cast iron or cast aluminum discs 30 and 31 are pivotally connected to each other as at 32. A handle rod 34 is threaded on the disc 30 and a handle rod 35 is threaded on the disc 31. The disc 30 is formed with a circular recess 38 in which the embossing disc or plate 38a is disposed, and this plate is provided with a lateral and central stud 39, like a split rivet, which has a spring pressure fit in the central hole 39a of the disc 30. The disc 31 is provided with a similar recess in which the embossing disc 36 is fitted, and this embossing disc 36 is provided with a split pin 37, which is snugly fitted in the hole 37a of the disc 31. A dough space is left between the confronting inner faces of the two embossing discs 38a and 36.

In Fig. 20 I show a spring pressure device for discharging a predetermined quantity of cookie dough on a pan. In a cylinder 50, having a sharp bevelled cutting edge 51a, a plunger 51 is movable and is mounted on the shaft 52, which slides through the bearing 53 of the end wall of the cylinder 50. The shaft 52 is formed with screw threads and is engaged by the circular nut 55, and an inverted U-shaped guide and handle 54 is mounted on the end wall of the cylinder. This guide is narrow enough to expose the side edges of the nut through the large openings between the legs of the U-shaped guide. A coil spring 56 is disposed between the nut 55 and the end wall of the cylinder 50. After the cylinder is filled with cake or cookie dough and the nut 55 is manually depressed the cookie dough in the cylinder will be expelled.

A screw 54b limits the travel of the nut 55, and this screw is threaded through the end bar of the U-shaped guide 54 against the nut 55.

In Figs. 22 and 23 I show a cookie molding disc 40 formed with a central transverse dovetailed opening and inwardly divergent side walls 41 on opposite sides of this opening. In this opening loose type elements 42 and spacer elements 43 are slidably arranged. As shown in Fig. 22 and word "Mary" is formed in negative for cookie embossing. A retaining disc 44 is inserted in the rear side of the disc 40, and is provided with a rim flange 45 which fits snugly in the rim flange of the disc 40, so as to retain the type and spacing elements in proper composition arrangement, against pressure displacement, when embossing cookie dough.

By this unit any housewife or other person, unskilled in forming letters by hand molding, may compose the name of any person to be honored with special cookies. By using small sized letters and spacing elements longer names can be composed.

It is understood that various changes in the details of construction, their arrangement and combination, may be made in accordance with the invention defined by the claims hereof.

Most social entertainment in small family and larger groups involves the use of food to keep the guests interested and to provide real benefits from the grouping of members of a family or organization, or neighbors.

The use of store cookies adds little novelty to the food offerings provided, and by means of my invention very thin cookies, wafer-like in body, with a great variety of designs, and with the use of personalized features, such as the names of persons or children, may be quickly produced from any suitable cake or cookie dough mixture, and the use of a standard electrical waffle or hot cake appliance.

Freshness and daintiness adds charm to cookies, and when dough mixtures of superior quality offer additional taste appeal, the food service can promote good will and generate fond memories of the happy exchanges which usually follow the serving of superior food.

Store cookies are frequently stale and heavy and lacking in special appeal. Guests know in advance what they will receive and there is no special thrill in serving store cookies. But by means of the system of ornamented discs and name discs, which may also carry embossed or formed initials or monograms, and by means of the adjustable or controlled thickness or depth of the cookie chamber or pocket, ornamental designs of great novelty appeal may be combined with wafer thin cookies which are personalized by the names of the guests or hosts or both, to express subtle suggestions of affection and friendship, or to memorialize some event of common interest.

Having described my invention I claim as patentable:

1. An attachment for electrical cooking appliances, comprising a plate having a series of sockets formed therein, each of said sockets having a threaded circular flange, a ring threaded against said flange, and a disc seated on the ring and movable therewith in said socket to vary the capacity of the socket for receiving dough.

2. The construction set forth in claim 1, the disc having ornamental designs impressable on food dough.

References Cited in the file of this patent

UNITED STATES PATENTS

| | | |
|---|---|---|
| 762,460 | Yore | June 14, 1904 |
| 798,710 | Smith | Sept. 5, 1905 |
| 871,250 | Wirth | Nov. 19, 1907 |
| 1,374,522 | Peterson | Apr. 12, 1921 |
| 1,490,177 | Matson | Apr. 15, 1924 |
| 1,578,132 | Kaefer | Mar. 23, 1926 |
| 1,835,628 | Bellinghausen | Dec. 8, 1931 |
| 2,358,452 | Garstang | Sept. 19, 1944 |

FOREIGN PATENTS

| | | |
|---|---|---|
| 380,034 | Great Britain | Sept. 8, 1932 |